April 15, 1952     G. G. HUNTER     2,593,305
WEATHER STRIP
Filed Feb. 14, 1949
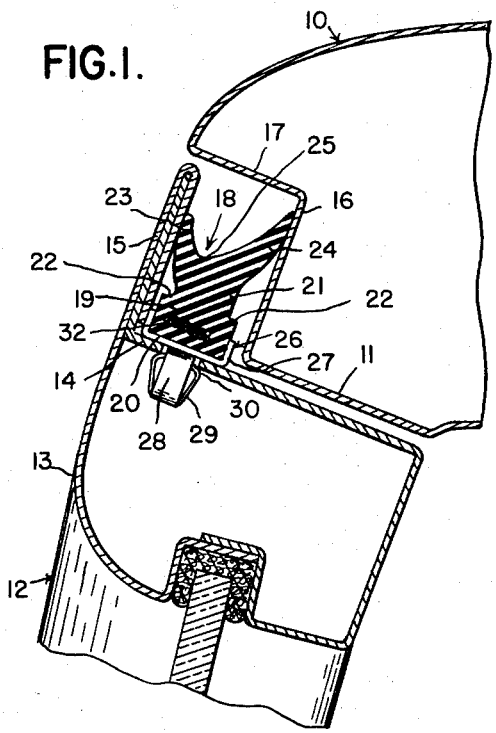
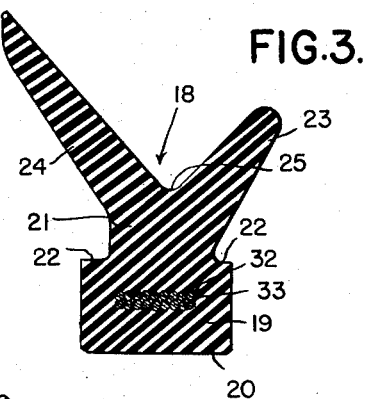
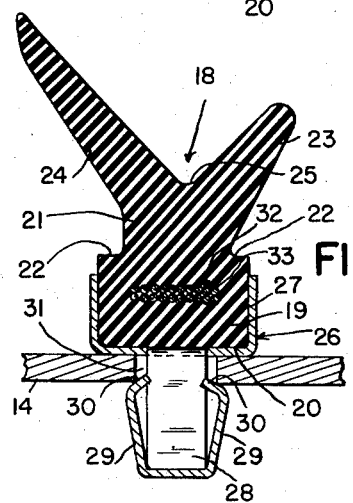
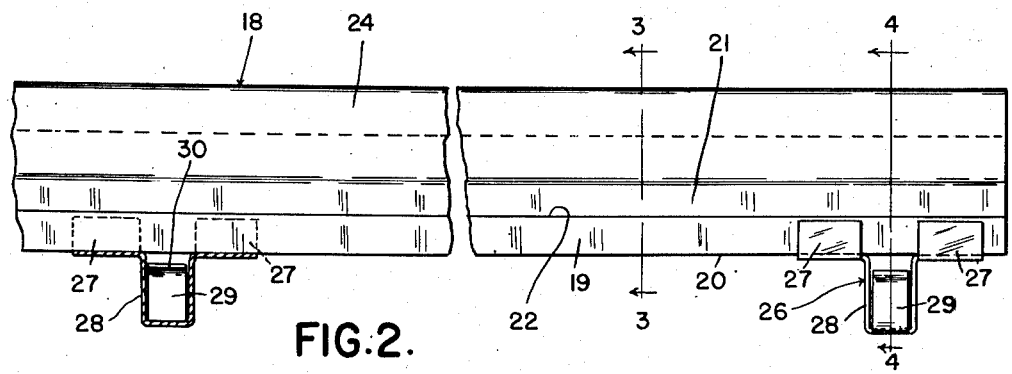
INVENTOR.
GERALD G. HUNTER
BY
ATTORNEYS Patented Apr. 15, 1952

2,593,305

UNITED STATES PATENT OFFICE 2,593,305

WEATHER STRIP

Gerald G. Hunter, Pontiac, Mich., assignor to Baldwin Rubber Company, Pontiac, Mich., a corporation of Michigan Application February 14, 1949, Serial No. 76,238

5 Claims. (Cl. 296—44)

1

This invention relates generally to weather sealing strips for closures, and refers more particularly to improvements in weather strips for vehicle body closures or doors.

It is an object of this invention to provide a strip which not only effectively weather seals the clearance space between a door or closure and the adjacent jamb structure in the closed position of the door, but in addition, serves as a gutter or trough for conducting water away from the door or closure opening.

Another object of this invention is to provide a weather seal in the form of an elongated strip of resilient material having a base section at one edge and having lips diverging outwardly from the base. The lips not only cooperate to form the desired trough or gutter, but also respectively extend beyond opposite sides of the base in positions to respectively engage a marginal part of the door and an adjacent face of the jamb in the closed position of the door.

Still another object of this invention is to provide a weather sealing strip extruded or otherwise formed from a vulcanizable material and having metal clips vulcanized, bonded or otherwise secured to the base at points spaced from each other lengthwise of the base. In accordance with this invention the clips are provided with head portions insertable through openings in a part of the door structure and having resilient fingers for frictionally holding the strip in place.

A further object of this invention is to strengthen the strip in the region of the attaching clips by a metal reinforcement comprising flexible strands of wire embedded in the base and extending for substantially the full length of the strip.

A still further object of this invention is to provide a weather sealing strip of the above general type wherein the width of one of the lips is less than the width of the other, and acts as a reinforcing rib to retain the trough or gutter formation in instances where the strip is bent around the corners or compound curves of the door or other part.

The foregoing as well as other objects will be made more apparent as this description proceeds, especially when considered in connection with the accompanying drawing, wherein:

Figure 1 is a sectional view of a part of a vehicle body construction and showing a weather sealing strip embodying the features of this invention;

2

Figure 2 is a side elevational view of the weather sealing strip shown in Figure 1;

Figure 3 is an enlarged cross sectional view taken on the line 3—3 of Figure 2; and Figure 4 is an enlarged cross sectional view taken on the line 4—4 of Figure 2.

The weather sealing strip forming the subject matter of this invention may be used in connection with practically any type of closure, and is particularly advantageous when employed in association with closures subjected to the weather. One application wherein the weather strip operates highly satisfactorily is in connection with vehicle bodies to weather seal the clearance space usually provided between the door of the body and the surrounding frame structure.

With the above in view, reference is made to Figure 1 of the drawing, wherein the numeral 10 indicates a part of a vehicle body structure having a transversely extending section 11 shaped to form a door opening. The opening is normally closed by a door 12 having a frame 13 extending around the perimeter thereof and hinged at one side in a manner not shown herein to the adjacent side of the body section 11. The door frame 13 has a transverse portion 14 arranged to lie adjacent the transverse section 11 in the closed position of the door, and also has an outwardly extending flange 15 adapted to overlie a flange 16 extending outwardly from the body section 11. In accordance with conventional practice, the jamb flange 16 is spaced laterally inwardly from the overlapping door flange 15 when the door is in its closed position, and the space between the flanges is concealed by an overhanging flange 17, which extends laterally outwardly from the outer edge of the jamb flange 16.

The space between the flanges 15 and 16 as well as the clearance between the transverse portions 11 and 14 is sealed by a weather strip 18, which also acts as a buffer for the door. The weather strip 18 is formed of a resilient material preferably rubber, synthetic rubber or some equivalent material capable of being vulcanized and extruded. In addition, the shape of the weather strip is preferably such as to enable the same to be extruded in substantially continuous lengths, although other modes of manufacture may be used.

In any case the weather strip comprises a base 19 preferably substantially rectangular in cross section and having a flat inner surface 20 which provides a generous area of contact with a supporting part. As shown in Figure 3 of the drawing the outer face of the base 19 has a rib-like portion 21 of a width somewhat less than the width of the base to provide transverse shoulders 22 at opposite sides of the rib. The rib 21 is extended to form outwardly diverging arms or lips 23 and 24. The free edges of the lips respectively project laterally outwardly beyond opposite sides of the base 19, and the inner surfaces of the lips cooperate to form a trough or gutter 25.

In use the weather strip 18 is interposed between the overlapping door flange 15 and the jamb flange 16 with the inner surface 20 of the base 19 seated on the transverse door frame portion 14. As shown in Figure 1 of the drawing, the strip 18 is positioned with the lip 23 adjacent the door flange 15, and with the lip 24 adjacent the jamb flange 16. The distance between the free edge portions of the lips is substantially greater than the distance between the door flange 15 and jamb flange 16 in the closed position of the door so that the lip portions are moved toward one another when the door is closed. Thus the free edge of the lip 23 yieldably engages the door flange 15, and the free edge of the lip 24 yieldingly engages the jamb flange 16.

It will also be noted from Figure 1 of the drawing that the width of the lip 23, measured from its base to its tip, is substantially less than the width of the lip 24. As a result of this construction the lip 23 actually serves as a reinforcement, and renders it possible to retain the trough or gutter formation when the strip is deformed to extend around a corner of the door, for example.

In accordance with the present invention the strip 18 is detachably secured to the door by snap fasteners. In detail a plurality of metal clips 26 are vulcanized, bonded or otherwise permanently secured to the base 19 of the strip 18 at points spaced from each other in the direction of length of the strip 18. Each clip 26 comprises laterally spaced channel-shaped portions 27 integrally connected together by a U-shaped section forming a head 28. The channel-shaped end portions 27 are of sufficient dimension to receive the base 19 of the strip, and the head portion 28 extends inwardly from the base 19.

During assembly the head portions 28 on the clips 26 respectively project through openings 31 formed in the portion 14 of the door frame, and are frictionally held in place by spring fingers 29. The spring fingers 29 project outwardly from opposite sides of the head 26, and the outer ends 30 are bent laterally inwardly to provide shoulders for retaining the heads 28 in assembled relation with the door frame. As shown particularly in Figure 4 of the drawing, the fingers 29 flare laterally outwardly from opposite sides of the head and have a cam engagement with the edges of the part 14 surrounding the openings 31. Thus the fingers 29 are flexed laterally inwardly as the heads are passed through the openings 31, and return to their outermost positions when the heads 28 are fully inserted through the openings 31. This laterally outward return movement of the fingers 29 positions the laterally inwardly extending portions 30 of the fingers at the inner sides of the part 14 and prevents accidental removal of the weather sealing strip 18.

In some instances it may be advantageous to reinforce the weather strip 18 in the region of the fastener clips 26. For accomplishing this result a reinforcement 32 is provided comprising a plurality of lengths of flexible wire 33 extending for substantially the full length of the base 19 and embedded within the latter. As shown in Figures 3 and 4 of the drawing, the lengths of wire 33 are arranged in superposed rows which extend transversely of the base 19, and provide a reinforcement 32 of substantial width. Thus the base 19 is materially strengthened throughout the length of the strip, and retains its intended shape over long periods of use. It will, of course, be understood that other forms of flexible reinforcements may be used, such for example, as fabric tapes.

What I claim as my invention is:

1. The combination with a vehicle door hinged at one side edge to a frame having a transverse portion defining an opening for the door and having a jamb portion extending from the transverse portion for engagement by an overlapping flange on the door, of a weather seal extending along the top and at least one adjacent side of the door between the overlapping flange on the door and jamb portion on the frame, said weather seal comprising an elongated resilient strip having a base seated on the outer edge of the door at the laterally inner side of the overlapping flange, lips diverging from the base in an outward direction with respect to the door to provide a gutter and having the free edges respectively extending laterally outwardly beyond opposite sides of the base to respectively yieldingly engage the overlapping flange on the door and the jamb portion on the frame in the closed position of the door and being free from connection to either the flange or frame, one of the lips has a width less than the width of the other lip and serves as a reinforcement to minimize spreading of the lips by the stresses resulting from bending the strip around a corner of the door, and means for securing the base of the strip to the transverse portion of the door.

2. A weather sealing member comprising an elongated strip of resilient material having a base section at one edge, lips diverging in an outward direction from the base and respectively extending laterally beyond opposite sides of the base, said lips cooperating to form a V-shaped trough therebetween and one of the lips having a width substantially less than the width of the other lip and reinforces the latter to minimize spreading of the lips by the stresses resulting from bending the strip transversely of its length in a direction opposite the direction in which the lips extend, and a flexible reinforcement embedded in said base and extending for substantially the full length of the strip.

3. A weather sealing member comprising an elongated strip of resilient material having a base section at one edge, and lips diverging in an outward direction from one side of the base and respectively extending laterally beyond opposite sides of the base to form a trough, said lips cooperating to provide a V-shaped trough therebetween and one of the lips having a width less than the width of the other lip and reinforces the latter to minimize the spreading of the lips by the stresses resulting from bending the strip transversely of its length in a direction opposite the direction in which the lips extend.

4. A weather sealing member comprising an elongated strip of resilient material having at one edge a base section substantially rectangular in cross section and having a rib portion of less width than the base extending along one side of said base, and lips diverging in an outward direction from the rib portion and having the free ends respectively extending laterally outwardly beyond opposite sides of the base.

5. A weather sealing member comprising an elongated strip of resilient material having at one edge a base section substantially rectangular in cross section and having a rib portion of less width than the base extending along one side of said base, and lips diverging in an outward direction from the rib portion and having the free ends respectively extending laterally outwardly beyond opposite sides of the base, one of the lips having a width substantially less than the width of the other lip and forming with the latter a trough.

GERALD G. HUNTER.

REFERENCES CITED

The following references are of record in the file of this patent:

UNITED STATES PATENTS

| Number | Name | Date |
| --- | --- | --- |
| 2,077,604 | Wiley | Apr. 20, 1937 |
| 2,161,648 | Widman | June 6, 1939 |
| 2,176,964 | Harrah | Oct. 24, 1939 |
| 2,263,806 | Hammerl | Nov. 25, 1941 |
| 2,443,959 | Merrill | June 22, 1948 |

FOREIGN PATENTS

| Number | Country | Date |
| --- | --- | --- |
| 581,038 | Germany | July 20, 1933 |
| 833,934 | France | Aug. 1, 1938 |